US009760820B2

(12) United States Patent
Lin et al.

(10) Patent No.: US 9,760,820 B2
(45) Date of Patent: Sep. 12, 2017

(54) METHOD FOR GENERATING COLOR QR CODE

(71) Applicant: Yuan Ze University, Taoyuan (TW)

(72) Inventors: Pei-Yu Lin, Taoyuan (TW); Wei-Chih Liao, Taipei (TW); Ran-Zan Wang, Taoyuan (TW)

(73) Assignee: YUAN ZE UNIVERSITY, Zhongli, Taoyuan County (TW)

( * ) Notice: Subject to any disclaimer, the term of this patent is extended or adjusted under 35 U.S.C. 154(b) by 0 days.

(21) Appl. No.: 15/164,059

(22) Filed: May 25, 2016

(65) Prior Publication Data

US 2017/0185880 A1     Jun. 29, 2017

(30) Foreign Application Priority Data

Dec. 28, 2015   (TW) .............................. 104144040 A

(51) Int. Cl.
*G06K 19/06*     (2006.01)
*G06T 11/00*     (2006.01)

(52) U.S. Cl.
CPC ... *G06K 19/0614* (2013.01); *G06K 19/06037* (2013.01); *G06T 11/001* (2013.01)

(58) Field of Classification Search
CPC ...... G06K 7/14; G06K 7/1404; G06K 7/1408; G06K 7/1417; G06K 7/1434; G06K 7/1439; G06K 7/1473; G06K 19/06; G06K 19/06009; G06K 19/06037; G06K 19/06046; G06K 19/0614

See application file for complete search history.

(56) References Cited

U.S. PATENT DOCUMENTS

| | | | |
|---|---|---|---|
| 9,390,358 B1* | 7/2016 | Cheung | G06K 19/06103 |
| 2013/0221105 A1* | 8/2013 | Cheong | G06K 19/06037 |
| | | | 235/469 |
| 2015/0324946 A1* | 11/2015 | Arce | G06T 1/0021 |
| | | | 382/251 |

* cited by examiner

*Primary Examiner* — Thien M Le
*Assistant Examiner* — April Taylor
(74) *Attorney, Agent, or Firm* — Muncy, Geissler, Olds & Lowe, P.C.

(57) ABSTRACT

A method for generating a color QR code includes: generating a grayscale image according to a color image; providing a QR code and dividing the grayscale image into the number of grayscale image modules matching module numbers of the QR code; generating a threshold mask image from grayscale image modules; cutting out each center block from center part of each grayscale image module and calculating characteristics values of the center blocks; identifying color of each module of the QR code, and comparing the characteristics values of the center blocks of the grayscale image to the corresponding threshold value compensated by robustness value to identify center blocks needing pixel luminance adjustment; dividing the center blocks needing pixel luminance adjustment into multiple layers of blocks; adjusting pixel luminance of the multiple layers of blocks using the robustness value times with corresponding weightings; and generating a fused color QR code.

10 Claims, 10 Drawing Sheets
(3 of 10 Drawing Sheet(s) Filed in Color)

METHOD FOR GENERATING COLOR QR CODE

CROSS-REFERENCE TO RELATED APPLICATION

This application claims the benefit of Taiwan Patent Application No. 104144040, filed on Dec. 28, 2015, in the Taiwan Intellectual Property Office, the disclosure of which is incorporated herein in its entirety by reference.

BACKGROUND OF THE INVENTION

1. Field of the Invention

The present disclosure generally relates to a method for generating a color QR code.

2. Description of the Related Art

Generally, scanning a QR code (Quick Response Code) through a smartphone can obtain information instantly. The QR code is mainly consisted of black and white modules, and characterized by its fault tolerance since error can be corrected to restore the intended information. As a result, the reliability of QR code is promoted greatly. With the popularity of network media and smartphones, people become more and more dependent on obtaining the desired information through smartphones. Nowadays, the QR code is usually applied to the transmission of advertising media; a user can align the smartphone camera to the QR code to conveniently obtain the link to the website, such that the hassle of manual input is avoided. In addition, by embedding web addresses, the QR code can link to various websites such as audio-visual websites and advertisement pages, or can store information such as product details, addresses, phone numbers, personal name cards and identifications, and so on. Furthermore, the QR code is also utilized in electronic invoices, printed media, billboards, posters, merchandises, tickets, libraries and museums so as to facilitate the user to rapidly obtain the stored information through the smartphone.

SUMMARY OF THE INVENTION

The present application provides a method for generating a color QR code which includes: generating a grayscale image according to a color image; providing a QR code, and dividing the grayscale image into a number of grayscale image modules matching the module number of the QR code; generating a threshold mask image from the grayscale image modules, wherein the threshold mask image has a plurality of threshold values corresponding to the grayscale image modules; cutting out each center block from a center part of each of the grayscale image modules and calculating characteristics value for each of the center blocks; comparing the characteristics value of each center block of the grayscale image to the adjusted threshold value, and identifying the color of the corresponding module of the QR code as a first color or a second color, in order to identify the center blocks that need pixel luminance adjustment; dividing the center blocks that are to be adjusted into a plurality of layers of blocks, wherein, each layer of the blocks has a corresponding weighting; adjusting a pixel luminance the plurality of layers of blocks using the robustness value and the corresponding weighting to produce an adjusted grayscale image; and generating a fused color QR code. Wherein, the adjusted threshold value is the corresponding threshold value of the threshold mask image compensated by a robustness value; for the center blocks in the grayscale image modules and the corresponding modules of the QR code, if the characteristics value is larger than the adjusted threshold value and the color of the corresponding module of the QR code is the first color, or if the characteristics value is smaller than the adjusted threshold value and the color of the corresponding module of the QR code is the second color, the center block is identified as needing pixel luminance adjustment.

Reference will now be made in detail to the exemplary embodiments of the present disclosure, examples of which are illustrated in the accompanying drawings. Therefore, it is to be understood that the foregoing is illustrative of exemplary embodiments and is not to be construed as being limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF THE PREFERRED EMBODIMENTS

The QR code is essentially consisted of black and white modules, which resembles a disordered and meaningless pattern in the human visual system. In order to imbue the QR code with visual effect that is meaningful to human, the present disclosure provides a method to enhance the QR code with visual effect while remaining machine readable. The purpose of the present disclosure primarily aims at achieving a mapping between the color image and the QR code. The module of the QR code is regarded as a unit, and the image is divided into a number of modules which is equivalent to the module number of the QR code so as to calculate the optimal image threshold value for accurate decoding. Then, the luminance of the center block of each image module corresponding to each module of the QR code is adjusted such that a color QR code can be obtained at last, which possesses visible visual effect and can be accurately decoded.

Figure 1:
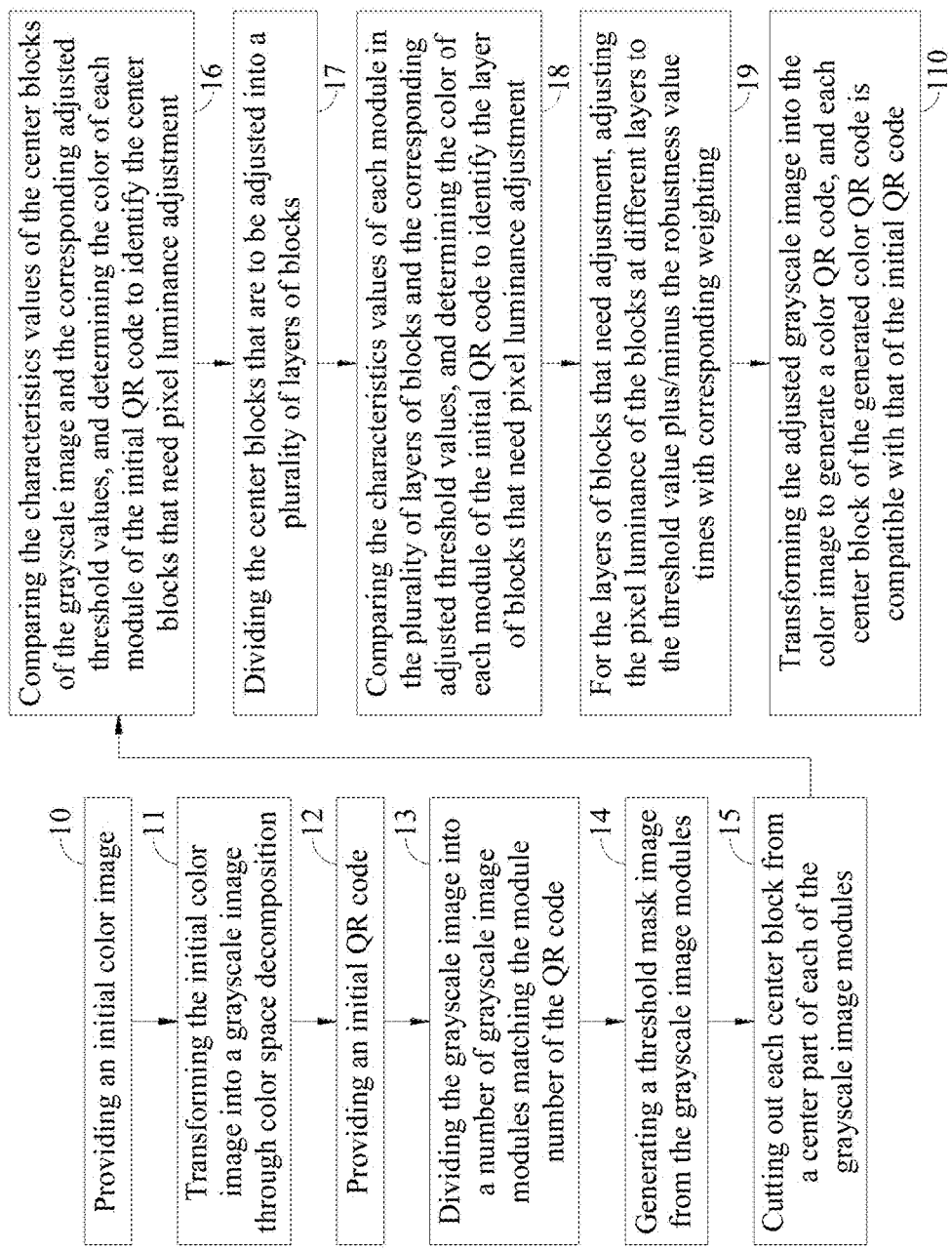
FIG. 1 is a flow chart of an exemplary embodiment of a method for generating a color QR code in accordance with the present disclosure.

FIG. 1 is a flow chart of an exemplary embodiment of a method for generating a color QR code in accordance with the present disclosure. Each textbox shown in FIG. 1 indicates one or more steps. In step 10, an initial color image is provided. In step 11, the initial color image is represented by color spaces such as YUV color space. Here, the component Y indicates luminance of the image, and components U and V are chrominance. But the present disclosure shall be not limited thereto and other color space representation can be chosen. The present embodiment aims to adjust the luminance of the image, so the component Y is taken out of the YUV color space without changing the remaining components. A grayscale image is generated from the component Y.

In step 12, an initial QR code is provided. The initial QR code includes input information, and has a module number representing the number of black and white dots making up the QR code. In step 13, the grayscale image is divided into a number of modules equivalent to the module number of the QR code. In step 14, a threshold mask image is generated from the modules of the grayscale image by method of local binarization.

In step 15, a center part of each of the grayscale image modules is cut out to form a center block. For example, the size of the grayscale image modules can be 24×24 unit area, and the size of the center blocks can be 8×8, 7×7 or 10×10 unit area. In step 16, the characteristics value, e.g. the luminance of the center blocks of the grayscale image is compared with the adjusted threshold values of the modules, and the color of the modules of the initial QR code is identified as a first color or a second color. Wherein, the adjusted threshold values are the threshold values corresponding to the center blocks which are compensated by robustness α. The first and second color may be respectively black and white, but not limited thereto. To be precise, in the corresponding module, when the characteristics value of a center block of the grayscale image is higher than the corresponding threshold value plus the robustness value α, and the corresponding module of the initial QR code is second color, the pixel luminance in the module is maintained. The characteristics value can be a mean luminance in the present embodiment, but not limited thereto. Similarly, when the characteristics value of a center block of the grayscale image is lower than the threshold value minus the robustness value α, and the corresponding module of the initial QR code is first color, the pixel luminance of the center block of the module is maintained. The following mathematical formula illustrates the method mentioned above.

$$Y_{i,j} = \begin{cases} Y_{i,j} & \text{if } Y_i \leq T_i - \alpha, Q_i = 0, \\ Y_{i,j} & \text{if } Y_i \geq T_i + \alpha, Q_i = 1. \end{cases} \quad (1)$$

Where, $Y_{i,j}$ is the luminance of the center block on the coordinate position. (i, j) denotes the coordinate position with respect to the image. $Y_i$ is the mean luminance of the center block. $T_i$ is the threshold value of the threshold mask image on the coordinate position. $Q_i$ is the color of the module of the QR code on the coordinate position. First color is denoted by 0 and second color is denoted by 1. When $Y_i \leq T_i - \alpha$, $Q_i = 0$, the mean luminance $Y_i$ of the center block on the coordinate position is lower than or equals to the threshold value $T_i$ minus the robustness value α on the coordinate position and the color $Q_i$ of the corresponding module of the QR code is first color, so the luminance $Y_{i,j}$ of the center block is maintained. When $Y_i \geq T_i + \alpha$, $Q_i = 1$, the mean luminance $Y_i$ of the center block on the coordinate position is higher than or equals to the threshold value $T_i$ minus the robustness value α on the coordinate position and the color $Q_i$ of the module of QR code is second color, so the luminance $Y_{i,j}$ of the center block is maintained. In a sense, the purpose of step 16 is to use the threshold value $T_i$ and the robustness value α as the reference to determine whether a module of the grayscale image and a module of the initial QR code have matching color.

In step 17, if a center block of the grayscale image module is to be adjusted, the center block is cut inwardly to form a plurality of layers of blocks. For example, when the characteristics value such as the mean luminance of a center block of the grayscale image is lower than the corresponding threshold value of the module plus the robustness value α and the corresponding module of the initial QR code is second color, the center block is identified as needing pixel luminance adjustment, hence the center block is taken out and cut inwardly into a plurality of layers of blocks. Similarly, when the mean luminance of a center block of the grayscale image is higher than the threshold value of the corresponding module minus the robustness value α and the corresponding module of the initial QR code is first color, the center block is taken out and cut inwardly into a plurality of layers of blocks since the center block needs pixel luminance adjustment.

In step 18, for the plurality of layers of blocks, the pixel luminance of the plurality of layers of blocks is compared to the adjusted threshold value, i.e. the corresponding threshold values compensated by the robustness value α, and the colors of the corresponding module of the initial QR code on each block in the plurality of layers is identified to determine whether the pixel luminance of the plurality of layers of blocks has to be adjusted. The adjustment will be illustrated in step 19.

In step 19, for the blocks in the plurality of layers that need pixel luminance adjustment, the amount of adjustment made to the pixel luminance depends on the corresponding threshold value $T_i$ and the robustness value α times with a weighting, which, in turn depends on which layer the block resides. The blocks in the plurality of layers form a plurality of frames and a center frame. The adjustment made to the pixel luminance of the blocks is the minimum in the outermost frame, and the adjustment increases from the outermost frame to the inner frames. The adjustment can follow the formula $T_i \pm w\alpha$, wherein, w denotes weighting; the weighting w increases from outer to inner frame. So the pixel luminance in the layers reduces/increases from outermost frame to inner frames. For example, in the outermost frame, the pixel luminance is adjusted to $T_i \pm 1\alpha$. The pixel luminance in next inner frame adjacent to the outermost frame is adjusted to $T_i \pm 2\alpha$. The pixel luminance in next inner frame is adjusted to $T_i \pm 3\alpha$. If the next frame is the center frame, the pixel luminance is adjusted to $T_i \pm 4\alpha$. So the weighting w of the robustness α of the center frame is higher, and the weighting w gradually reduces from inner to outer frame.

In step 110, the adjusted grayscale image Y and the UV components are recombined to form the color image to generate a color QR code, and each center block of the generated color QR code matches each module of the initial QR code.

Figure 2:
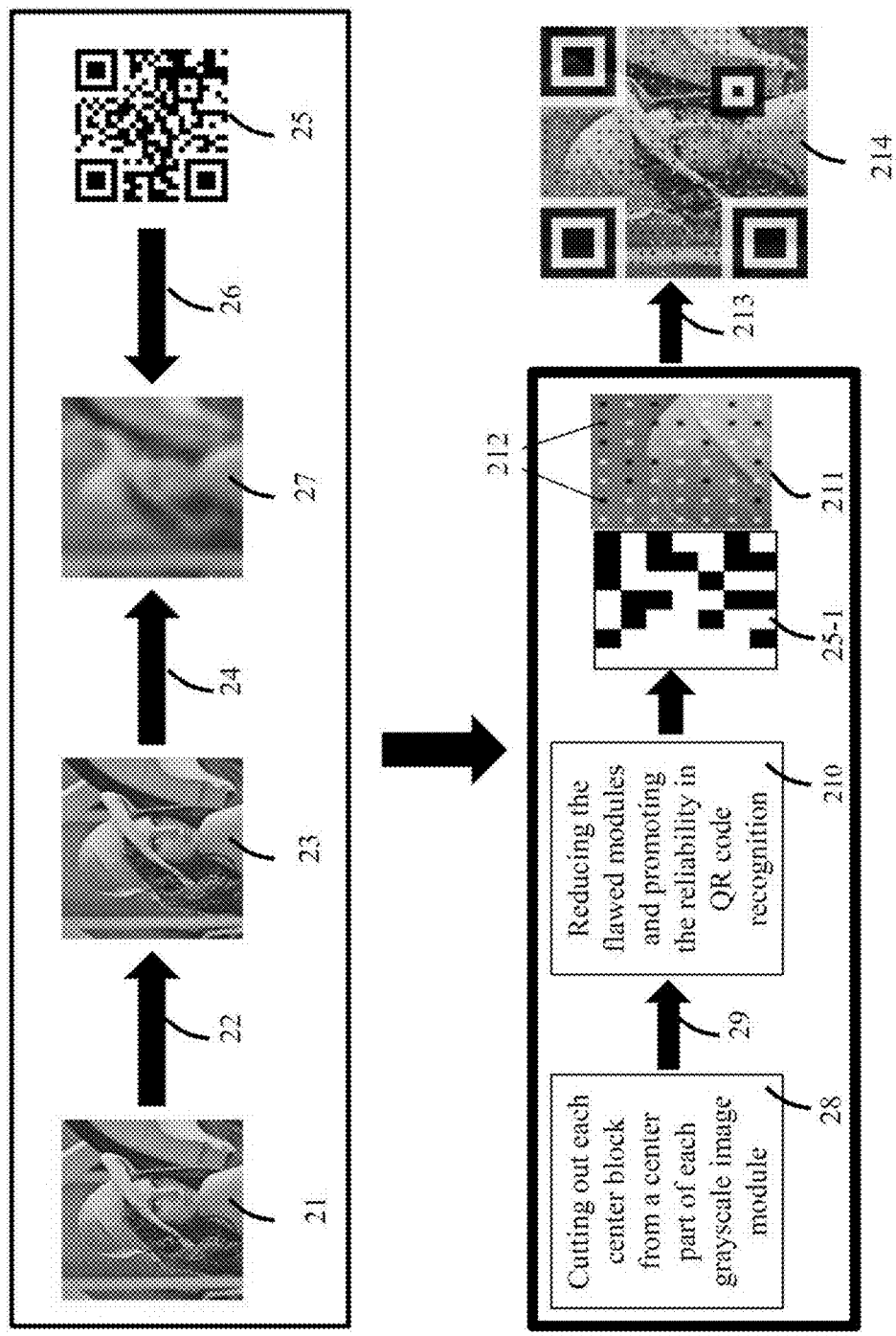
FIG. 2 is another flow chart of exemplary embodiment of a method for generating a color QR code in accordance with the present disclosure.

FIG. 2 is another flow chart of the exemplary embodiment of a method for generating a color QR code in accordance with the present disclosure. In step 22, an initial color image 21 is provided. The initial color image 21 is represented by YUV color space. Here, the component Y indicates luminance of the image, and components U and V are chrominance The present embodiment aims to adjust the luminance of the image, so the component Y is taken out of the YUV color space without changing the remaining components such that a grayscale image 23 is generated from the component Y. For this reason, the initial color image 21 in FIG. 2 is rendered in color to distinguish color image 21 from the grayscale image 23 which is essentially a black and white counterpart of the color image 21 and to better illustrate the cause and effect of step 22.

A QR code 25 is provided, and the QR code 25 includes input information. In step 24, the grayscale image 23 is divided into a number of modules equivalent to the module number of the QR code 25. In step 26, the image modules of the grayscale image 23 are transformed into a threshold mask image 27 by local binarization. The step mentioned above illustrates the generation of the threshold mask. In step 28, the center part of each of the grayscale image 23 modules generated in step 24 is cut out to form a center block.

In step 29, the pixel luminance of the center blocks of the image is compared to the threshold values of the corresponding modules and the color of the modules of the initial QR code is identified. If a center block of the grayscale image 23 module needs pixel luminance adjustment, the center block is cut inwardly into a plurality of layers of blocks. And then, for the plurality of layers of blocks, the pixel luminance of each block is compared with the adjusted threshold value, i.e. the corresponding threshold values compensated by the robustness value α, and the colors of the corresponding module of the initial QR code is identified, in order to determine whether the pixel luminance of the plurality of layers of blocks has to be adjusted. In step 210, for the blocks in the plurality of layers that need pixel luminance adjustment, the pixel luminance thereof is adjusted by the corresponding threshold value $T_i$ and the robustness value α times with a weighting depending on which layer the block resides. After that an adjusted grayscale image 211 is generated.

The adjusted grayscale image 211 includes the grayscale image 23 and each center block 212. Wherein, each center block 212 matches each module of the QR code 25. For example, each of the modules in a portion 25-1 of the QR code 25 is similar in color comparing to the center block 212 of each corresponding module of the grayscale image 23. In other words, the adjusted grayscale image 211 simultaneously includes the information respectively contained in the grayscale image 23 and the QR code 25. The QR code 25 is embedded into the grayscale image 23 without having the information therein affected.

In step 213, the adjusted grayscale image 211 is transformed into the color image to generate a color QR code 214 containing visual and artistic effect.

Figure 3:
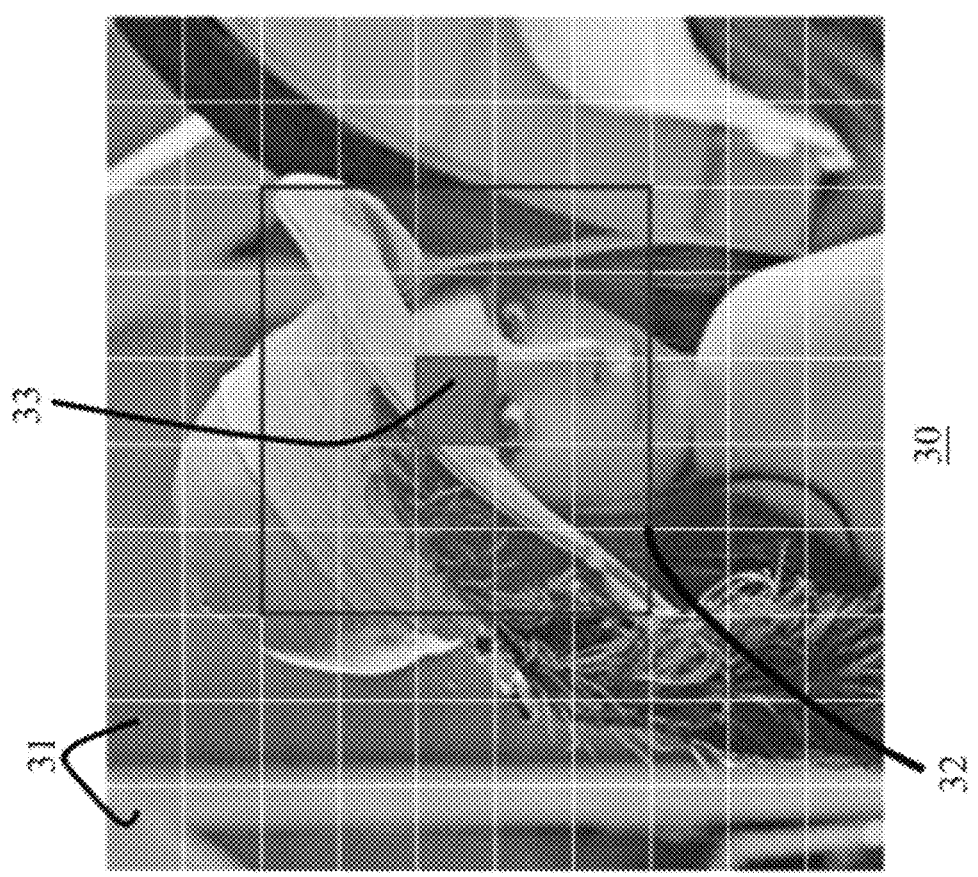
FIG. 3 is a schematic diagram illustrating the binarization of an exemplary embodiment of in accordance with the present disclosure.
Figure 4:
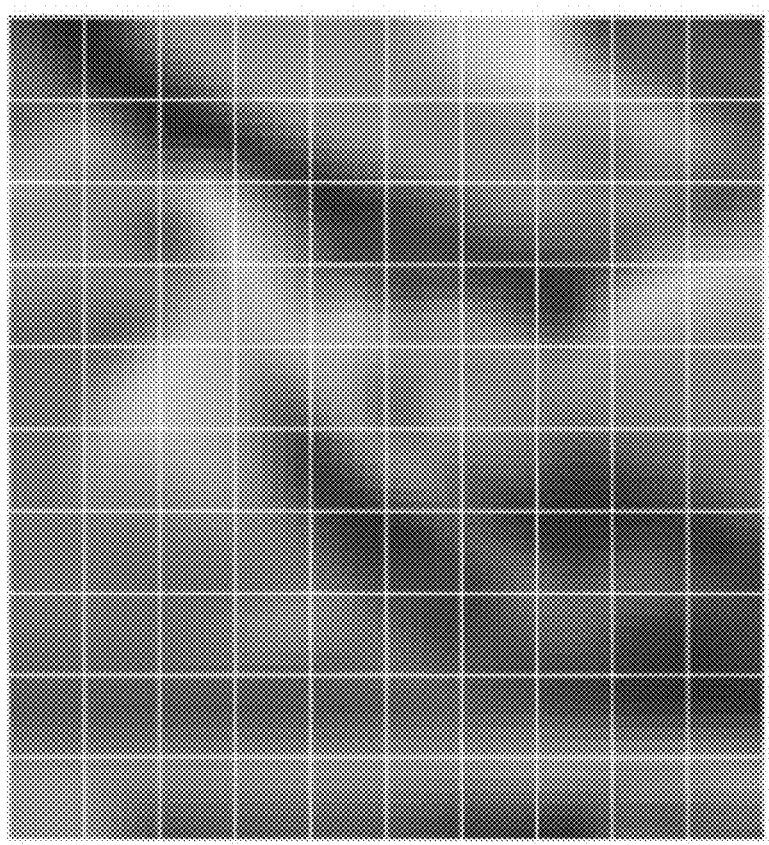
FIG. 4 is a schematic diagram of an exemplary embodiment of a threshold mask image in accordance with the present disclosure.

FIG. 3 is a schematic diagram of an exemplary embodiment of binarization in accordance with the present disclosure. The local binarization is used to transform the grayscale image 23 into the threshold mask image 27 as illustrated in step 26. The binarization is needed in this step. A hybrid local binarization which differs from the global binarization is applied in the present step. The conventional global binarization which is the simplest and easiest method only gives one threshold value. Nevertheless, the binary image obtained may not be optimal if the lighting is inhomogeneous. The local binarization can generate the optimal image even under the inhomogeneous lighting condition. The grayscale image 30 is divided into n×n image modules 31; where n is the number of the modules of the QR code along the height and width thereof. The method of local binarization uses a window 32 to calculate the average luminance for each module 31 of the grayscale image 30. The window 32 has 5×5 image modules 31 in number. The average pixel luminance of each image module 31 inside the window 32 is calculated, and the average pixel luminance is served as the threshold value of the image module at the center 33 of the window 32. With this method, threshold values are derived from each image module 31, and each threshold value generates a threshold mask image 40 as shown in FIG. 4.

Figure 5:
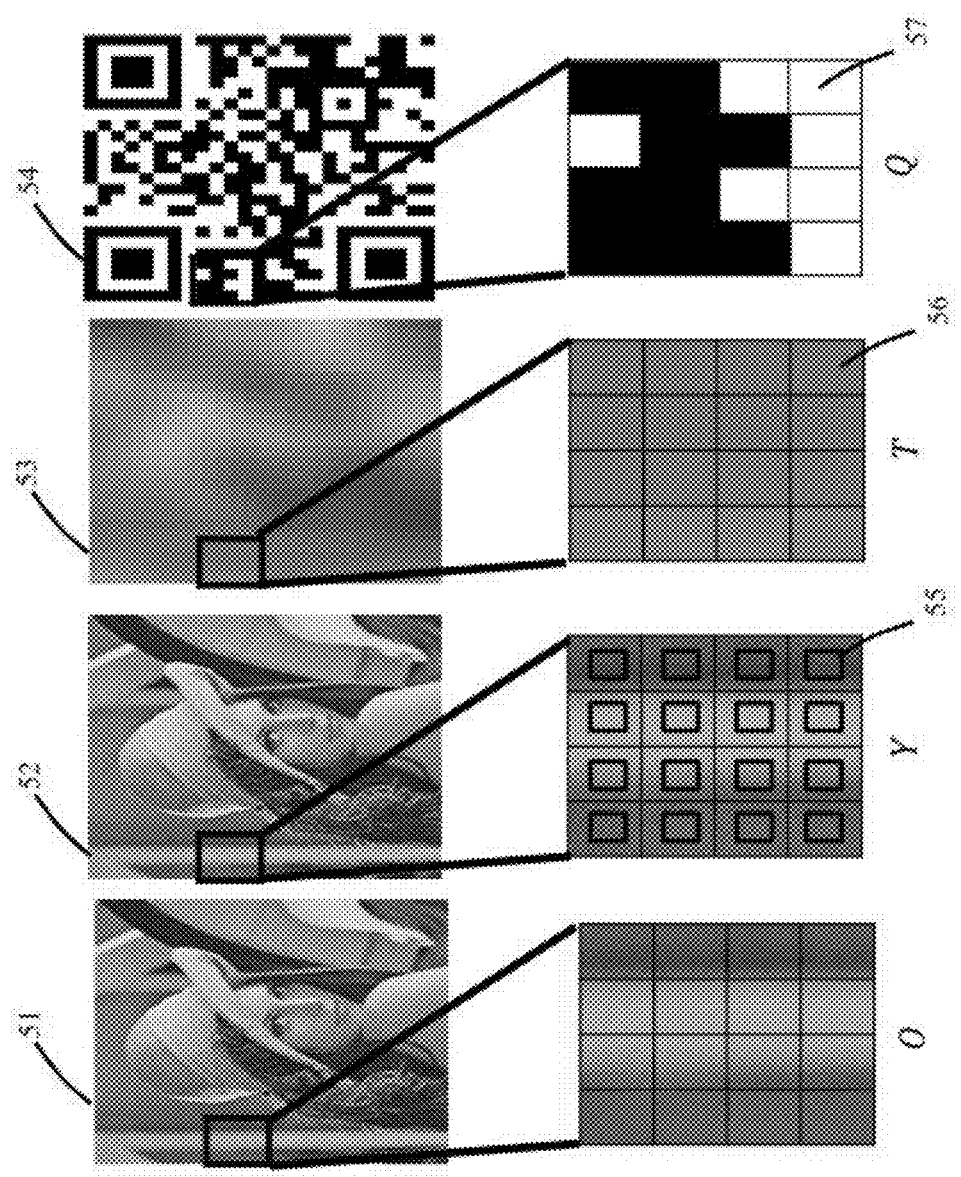
FIG. 5 is a schematic diagram of an exemplary embodiment to generate a color QR code in accordance with the present disclosure.

FIG. 5 is a schematic diagram of an exemplary embodiment of generation of a color QR code in accordance with the present disclosure. FIG. 5 shows the practical implementation of step 16. The modules of the color image 51 corresponding to the encoding region of the QR code 54 are processed as follows. An enlarged view of part of the color image 51 is denoted by O. The enlarged view of the corresponding part of the grayscale image 52 is denoted by Y. The enlarged view of the corresponding part of the threshold mask image 53 is denoted by T. The enlarged view of the corresponding part of the QR code 54 is denoted by Q. As shown in the figure, the blocks O, Y, T and Q correspond to one another. Similar to the FIG. 2, the color image 51 and the enlarged part thereof O in the FIG. 5 are rendered in color to distinguish from their counterpart rendered in grayscale, namely the grayscale image 52 and the enlarged part thereof Y, besides the color rendering offer better illustration to the effect of the present step. A characteristics value, which can be the mean luminance $Y_i$ in this embodiment, is calculated according to the center block 55 of the grayscale image 52. The mean luminance $Y_i$ is compared to the threshold value $T_i$ of the module 56 on the coordinate position and the color of the module 57 on the coordinate position is identified, in order to determine identify the center block 55 needing pixel luminance adjustment. The step can be described in the formula as follows.

$$Y_{i,j} = \begin{cases} Y_{i,j} & \text{if } Y_i \leq T_i - \alpha, Q_i = 0, \\ Y_{i,j} & \text{if } Y_i \geq T_i + \alpha, Q_i = 1. \end{cases} \quad (2)$$

Where, $Y_{i,j}$ is the luminance of the center block 55 of the grayscale image 52 on the coordinate position, (i, j) denotes the coordinate position with respect to the image. $Y_i$ is the characteristics value (mean luminance) of the center block 55. $T_i$ is the threshold value of the module 56 in the threshold mask image 53 on the coordinate position. $Q_i$ is the color of the module 57 of the QR code 54 on the coordinate position wherein first color is denoted by 0 and second color is denoted by 1. When $Y_i \leq T_i - \alpha$, $Q_i = 0$, the mean luminance $Y_i$ value is lower than or equivalent to the threshold value $T_i$ minus the robustness value $\alpha$ on the coordinate position and the color $Q_i$ of the module of QR code 54 is first color, so the luminance $Y_{i,j}$ of the center block 55 of the image is maintained. When $Y_i \geq T_i + \alpha$, $Q_i = 1$, the mean luminance $Y_i$ is higher than or equivalent to the threshold value $T_i$ plus the robustness value $\alpha$ on the coordinate position and the color $Q_i$ of the module of QR code 54 is second color, so the luminance $Y_{i,j}$ of the center block 55 of the image is maintained. There is no adjustment applied to these center blocks because the image modules of the grayscale image 52 after binarization coincide with the color of the corresponding module of the QR code 54, so the adjustment is unnecessary.

Figure 6:
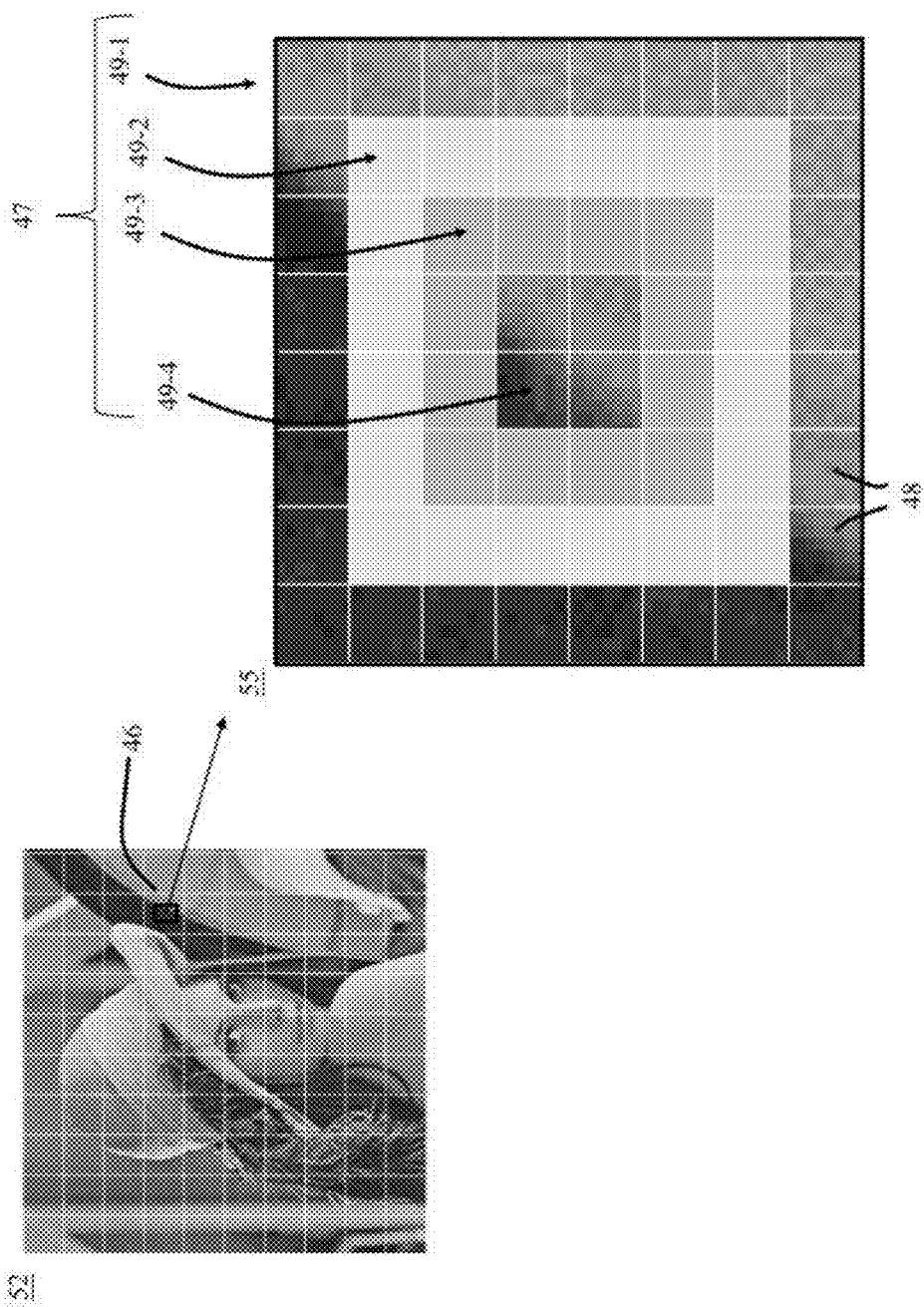
FIG. 6 is a schematic diagram illustrating a scheme to assign different weightings to the robustness value in accordance with an exemplary embodiment of the present disclosure.

FIG. 6 is a schematic diagram of an exemplary embodiment of assigning a robustness value with weighting in accordance with the present disclosure. FIG. 6 relates to the steps 16, 18 and 19 illustrated in FIG. 1, the relation is stated as follows. In step 16, the characteristics value (mean luminance) $Y_i$ of the center block 55 of the grayscale image 52 is compared to the threshold value $T_i$ of the corresponding module 56, and the color of the corresponding module 57 of the QR code 54 is identified, to find out the module which matches the formula (2) so as to maintain the luminance of that module.

In step 16, if a module does not match the aforementioned formula (2), the module is identified as needing pixel luminance adjustment. For example, when the mean luminance $Y_i$ of center block 55 of the image module 46 of the grayscale image 52 is lower than the threshold value $T_i$ of the corresponding module 56 plus the robustness value $\alpha$ and the corresponding module 57 of the QR code 54 is second color, the center block 55 of the grayscale image 52 is taken out and cut into smaller blocks. When the mean luminance $Y_i$ of the center block 55 of the image module 46 of the grayscale image 52 is higher than the threshold value $T_i$ of the corresponding module 56 minus the robustness value $\alpha$ and the corresponding module 57 of the QR code 54 is first color, the center block 55 of the grayscale image 52 is taken out and cut into smaller blocks. For example, if the center block 55 of the image module 46 is to be adjusted, the image module 46 is further cut into smaller modules. Wherein, the size of center block 55 of the image module 46 is 8×8 in unit area, but not limited thereto; the center block 55 is cut into a plurality of layers of blocks 47, the plurality of layers of blocks form frames 49-1, 49-2, 49-3 and a center frame 49-4.

In step 18, the pixel 48 luminance the plurality of layers of blocks of the center block 55 is compared to the threshold value $T_i$ of the corresponding module 56 compensated by the robustness value $\alpha$, and the color of the corresponding module 57 of the initial QR code 54 is identified, to determine whether the pixel 48 luminance of the plurality of layers of blocks 47 needs adjustment. Formula (3) illustrates the step which determines whether the pixel 48 luminance $Y_{i,j}$ of the plurality of layers of blocks 47 of the center block 55 is consistent with the color $Q_i$ of the module of the $$\text{QR code. } Y_{i,j} = \begin{cases} Y_{i,j} & \text{if } Y_i \leq T_i - \alpha, Q_i = 0, \\ Y_{i,j} & \text{if } Y_i \geq T_i + \alpha, Q_i = 1, \\ T_i - w\alpha & \text{if } Y_i > T_i - \alpha, Q_i = 0, \\ T_i + w\alpha & \text{if } Y_i < T_i + \alpha, Q_i = 1. \end{cases} \quad (3)$$

The threshold value $T_i$ is added to or subtracted by the robustness value $\alpha$. When $Y_i \leq T_i - \alpha$, $Q_i = 0$, the characteristics value (mean luminance) Yi of the pixel 48 of the plurality of layers of blocks on the coordinate position is lower than or equivalent to the threshold value $T_i$ on the coordinate position minus the robustness value $\alpha$, and the color $Q_i$ of the module of the QR code is first color; so the luminance $Y_{i,j}$ of pixel 48 of the plurality of layers of blocks 47 is maintained. When $Y_i \geq T_i + \alpha$, $Q_i = 1$, the mean luminance $Y_i$ of the pixel 48 of the plurality of layers of blocks on the coordinate position is higher than or equivalent to the threshold value $T_i$ on the coordinate position plus the robustness value $\alpha$, and the color $Q_i$ of the module of the QR code is second color; so the luminance $Y_{i,j}$ of the pixel 48 in the plurality of layers of blocks 47 is maintained. As a result, the step 18 use the addition or subtraction between the threshold value $T_i$ and the robustness $\alpha$ to determine whether to maintain the pixel 48 luminance $Y_{i,j}$ of the plurality of layers of blocks.

In step 19, the luminance of the pixel 48 in the plurality of layers of blocks 47 that is identified as needing adjustment in step 18 is adjusted. When $Y_i > T_i - \alpha$, $Q_i = 0$, the mean luminance $Y_i$ of the pixel 48 of the plurality of layers of blocks on the coordinate position is higher than the threshold value $T_i$ on the coordinate position minus the robustness value $\alpha$, and the color $Q_i$ of the corresponding module of the QR code is first color. As a result, the mean luminance $Y_i$ of the pixel 48 of the plurality of layers of blocks is adjusted to the threshold value $T_i$ minus the robustness value $\alpha$ times with weighting w. The plurality of layers of blocks 47 form the frames 49-1, 49-2, 49-3 and the center frame 49-4. The width of the frame 49-1 is equivalent to that of a block and the weighting w thereof is 1, as shown in FIG. 6; so the luminance of the pixel 48 in the frame 49-1 is adjusted to $T_i - 1\alpha$. The weighting w of the frame 49-2 is 2, so the luminance of the pixel 48 in the frame 49-2 is adjusted to $T_i - 2\alpha$. The frame 49-3 is with the weighting w=3, so luminance of the pixel 48 in the frame 49-3 is adjusted to $T_i - 3\alpha$. The center frame 49-4 is with the weighting w=4, so the luminance of the pixel 48 in the center frame 49-4 is accordingly adjusted to $T_i - 4\alpha$. Hence, the weighting w of the robustness value $\alpha$ of the center frame 49-4 is higher, and the weighting w of the robustness value $\alpha$ gradually reduces from inner to outer frame. The configuration of the weighting w is not limited to the present embodiment.

When $Y_i < T_i + \alpha$, $Q_i = 1$, the mean luminance $Y_i$ of the pixel 48 of the plurality of layers of blocks on the coordinate position is lower than the threshold value $T_i$ on the coordinate position plus the robustness value $\alpha$, and the color $Q_i$ of the corresponding module of the QR code is second color. As a result, the luminance $Y_{i,j}$ of the pixel 48 of the plurality of layers of blocks is adjusted to the threshold value $T_i$ plus the robustness value $\alpha$ times with weighting w. The pixel 48 in the frame 49-1 is with the weighting w=1, so the luminance of the pixel 48 in the frame 49-1 is adjusted to $T_i + 1\alpha$. The frame 49-2 is with the weighting w=2, so the luminance of the pixel 48 in the frame 49-2 is adjusted to $T_i + 2\alpha$. The frame 49-3 is with the weighting w=3, so luminance of the pixel 48 in the frame 49-3 is adjusted to $T_i + 3\alpha$. The center frame 49-4 is with the weighting w=4, so luminance of the pixel 48 in the frame 49-4 is adjusted to $T_i+4\alpha$. Since different settings of the display panel or inhomogeneous lighting of the QR code may induce error during scanning, the threshold value $T_i$ is compensated with the robustness value $\alpha$ to avoid the ambiguity due to the unadjusted pixel luminance $Y_{i,j}$ being too similar to $T_i$, such that the inaccuracy of scanning and decoding can be avoided. The setting of weighting is not limited to the present embodiment.

Figure 7:
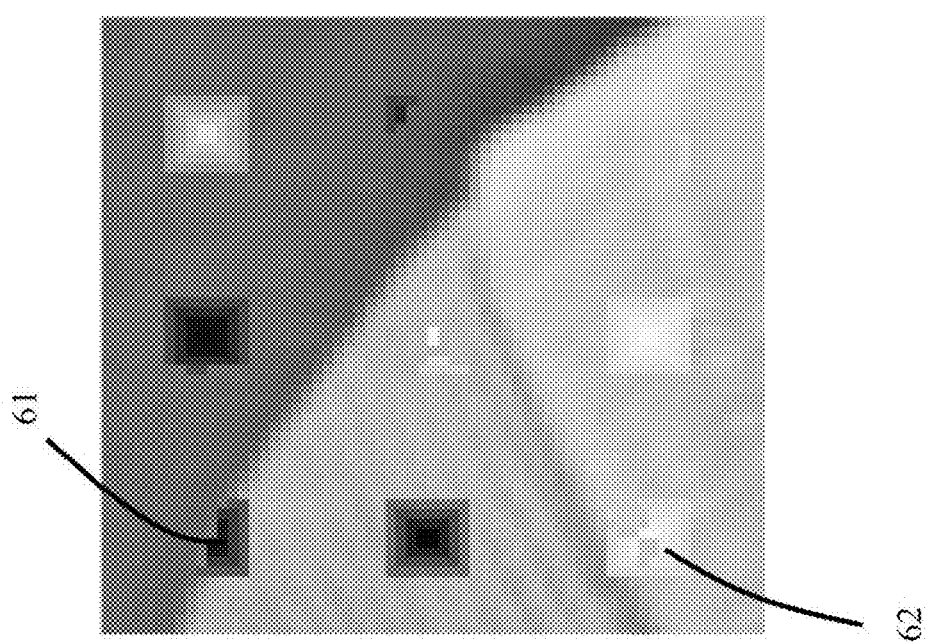
FIG. 7 and FIG. 8 are schematic diagrams illustrating the correction of the flawed modules of an exemplary embodiment of in accordance with the present disclosure.
Figure 8:
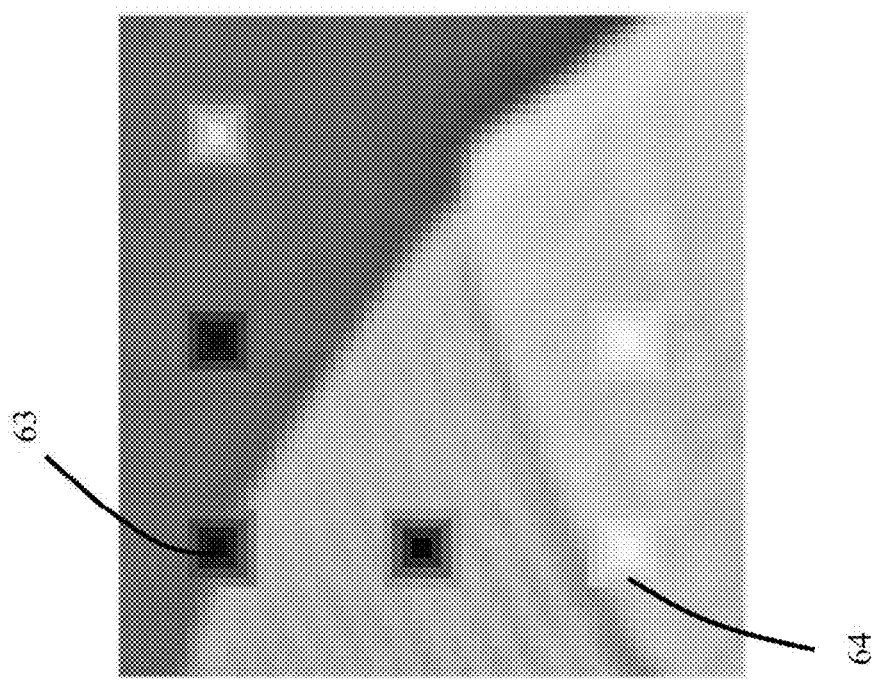

FIG. 7 and FIG. 8 are schematic diagrams of an exemplary embodiment illustrating the correction of the flawed modules in accordance with the present disclosure. After maintaining or adjusting the pixel luminance of some of the modules in steps 16, 18 and 19, the flawed modules 61 and 62 as shown in FIG. 7 can be reduced effectively. For example, in step 16, the characteristics value (mean luminance) of the center block of the image is compared to the threshold value of the corresponding module, and the color of the initial QR code is identified in order to determine whether the luminance of the center block of the image needs adjustment. The luminance of the center block of the image is maintained if the center block is identified as needing no adjustment. In step 18, if a block in the layer needs pixel luminance adjustment, the luminance $Y_{i,j}$ of the pixel is adjusted to the threshold value $T_i$ plus/minus the robustness value $\alpha$ times with weighting w so as to greatly reduce the flaw in the modules and to promote the recognition of the modules in the present embodiment. FIG. 8 shows the corrected modules 63 and 64.

Figure 9:
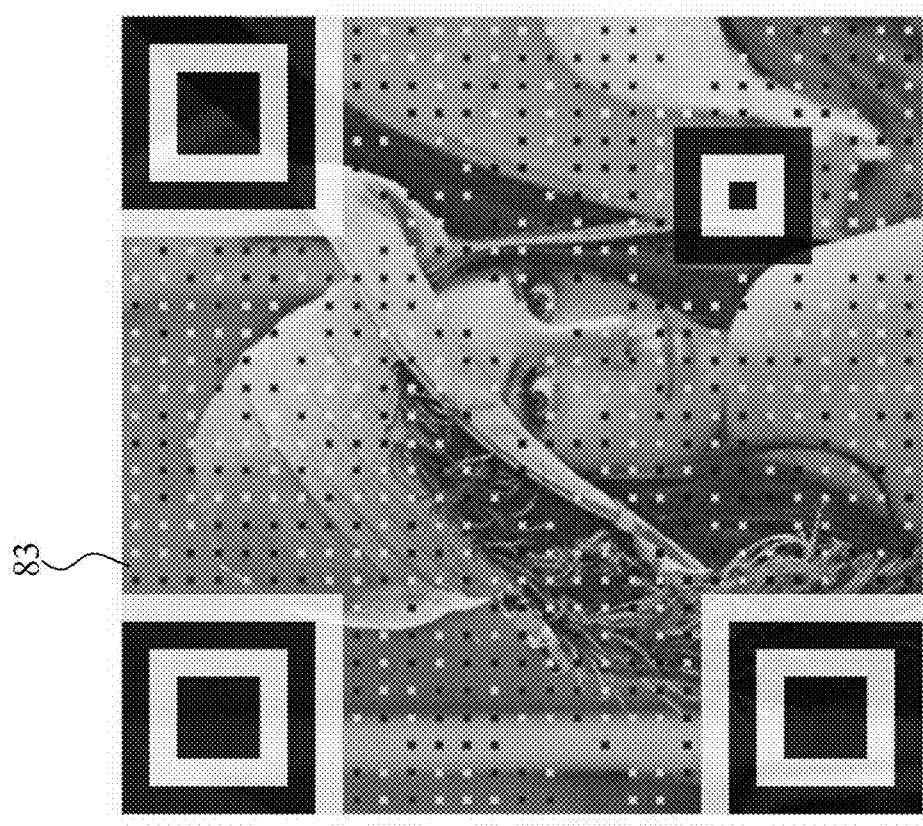
FIG. 9 is a schematic diagram of an exemplary embodiment of a color QR code in accordance with the present disclosure.

FIG. 9 is a schematic diagram of an exemplary embodiment of a color QR code in accordance with the present disclosure. It is noteworthy that the color QR code in FIG. 9 is rendered in color, so as to illustrate the final product of the method for generating color QR code of the present invention in a more precise manner. Since the present embodiment has made adjustment the component Y of the color image which is the grayscale image in the aforementioned steps, a final recombination of the adjusted component Y with the components U and V is needed so as to obtain a color QR code 83. The color QR code 83 holds the information contained in the initial QR code, and is fused with the color image which acts as the background thereof. According to the present disclosure, the initial QR code and the color image are fused without intervening with each other, and the visual effect of the initial QR code is thereby promoted. In addition, as the color QR code has meaningful visual effect, it contributes to the recognition of the QR code to the elders and the promotion of trademarks.

In a preferred embodiment, for the method for generating a color QR code in accordance with present disclosure, if the characteristics value of the center block is larger than the adjusted threshold value and the color of the corresponding module of the QR code is the second color, or if the characteristics value of the center block is smaller than the adjusted threshold value and the color of the corresponding module of the QR code is the first color, pixel luminance of the center block of the grayscale image is maintained.

In another preferred embodiment, for the method for generating a color QR code in accordance with present disclosure, the plurality of layers of blocks form a plurality of frames and a center frame. Moreover, the weighting corresponding to each layer of blocks reduces from the center frame to an outermost frame.

In yet another preferred embodiment, in the method for generating a color QR code in accordance with present disclosure, for the plurality of layers of blocks and the corresponding module of the QR code, if the characteristics value of the layer of blocks is larger than the adjusted threshold value and the color of the corresponding module of the QR code is the second color, or if the characteristics value of the layer of blocks is smaller than the adjusted threshold value and the color of the corresponding module of the QR code is the first color, the pixel luminance of the layer of block is maintained.

In a preferred embodiment, in the method for generating a color QR code in accordance with present disclosure, for the plurality of layers of blocks and the corresponding module of the QR code, if the characteristics value of the layer of blocks is larger than the adjusted threshold value and the corresponding module of the QR code is in the first color, or if the characteristics value of the layer of blocks is smaller than the adjusted threshold value and the corresponding module of the QR code is in the second color, the pixel luminance of the layer of blocks is adjusted.

In a preferred embodiment, for the method for generating a color QR code in accordance with present disclosure, if the characteristics value of the layer of blocks is larger than the corresponding threshold value minus the robustness value and the corresponding module of the QR code is in the first color, the pixel luminance of the layer of blocks is adjusted to the threshold value minus the robustness value times with corresponding weighting.

In a preferred embodiment, for the method for generating a color QR code in accordance with present disclosure, if the characteristics value of the layer of blocks is smaller than the corresponding threshold value plus the robustness value and the corresponding module of the QR code is in the second color, the pixel luminance of the layer of blocks is adjusted to the threshold value plus the robustness value times with corresponding weighting.

In a preferred embodiment, for the method for generating a color QR code in accordance with present disclosure, the fused color QR code is reproduced from the adjusted grayscale image.

In a preferred embodiment, the method for generating a color QR code in accordance with present disclosure further includes transforming the grayscale image modules into the threshold mask image by local binarization In a preferred embodiment, the method for generating a color QR code in accordance with present disclosure further includes scaling the color image and the QR code to matching size and aspect ratio.

Figure 10:
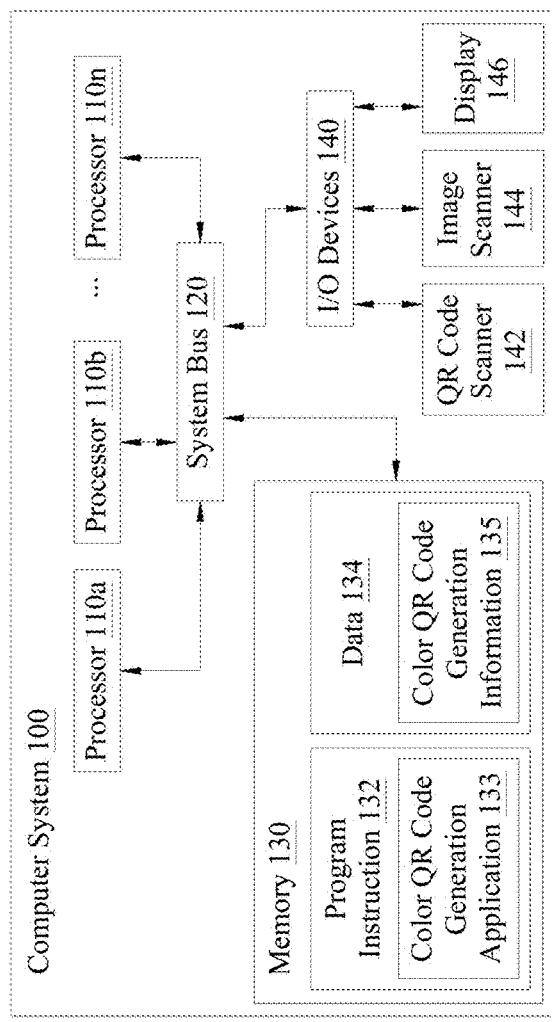
FIG. 10 is a block diagram illustrating the exemplary computer system to generate the color QR code according to an embodiment of the present invention.

It is apparent that various embodiments of the present invention disclosed herein may be executed on one or more computer systems, which may interact with various other devices. FIG. 10 is a block diagram illustrating the exemplary computer system to generate the color QR code according to an embodiment of the present invention. The computer system 100 includes one or more processors 110 connected to a system memory 130 through a system bus 120. The computer system 100 may further include one or more input/output (I/O) devices 140 connected to the system bus 120, e.g. a QR code scanner 142, an image scanner 144 and a display 146.

In various embodiments the computer system 100 may be a uniprocessor system having single processor 110 or a multiprocessor system having several processors 110*a*, 110*b* to 110*n*. For example, the multiprocessor computer system 100 may include two, four, eight, or other appropriate number of processors 110. In an embodiment the processors 110 may be general purpose processors or embedded processors that implement any of a variety of instruction set architectures (ISAs), e.g. the x86, PowerPC, SPARC, or MIPS ISAs, or any other suitable ISAs known to the person skilled in the art. In multiprocessor systems, each of the processors 110 may commonly implement the same ISA, but not limited thereto.

In an embodiment, the system memory 130 may be a random access memory such as SRAM, DRAM, SDRAM, etc., Flash-type memory or any other types of memory known to a person skilled in the art. The system memory 130 may store program data 134 and/or program instructions 132 accessible by processor 110. Program instructions 132 in FIG. 10 may implement the color QR code generation application 133 incorporating any of the steps disclosed hereinbefore. In addition, data 134 in the memory 130 may include color QR code generation information 135 containing any of the information or data structures disclosed hereinbefore, including but not limited to the information related to the color image and the YUV components thereof, the grayscale image, the threshold mask image, the initial QR code and the generated color QR code. In other embodiments, the color QR code generation application 133 and/or information may be received, sent or stored in different types of computer-accessible media or on similar media separated from the system memory 130 or the computer system 100. Any functionality disclosed in the context may be implemented in the computer system 100.

In an embodiment, the system bus 120 facilitates the data traffic between the processor 110, system memory 130 and various peripheral interfaces such as the I/O devices 140. In an embodiment the system bus may execute protocol, timing or data transformations necessary for the conversion of data signals from one component such as the processor 110 into a format suitable for another component, e.g. system memory 130. In some embodiments the system bus 120 may be a northbridge which provides fast communication with the processors 110, but not limited thereto. In some embodiments the system bus 120 may also support devices attached through peripheral buses conforming to PCI specification or USB specification. Also in some embodiments part or all of the functionality of the system bus 120 such as an interface to system memory 130 can be incorporated directly into processor 110.

In some embodiments, the I/O devices 140 in FIG. 10 may include the QR code scanner 142, image scanner 144 and the display 146. The QR code scanner 142 scans the initial QR code which will be stored in the system memory 130 for later use. The image scanner 144 is capable of scanning color image which will be fused with the initial color code later. In an embodiment the QR code scanner 142 may be a digital camera or a camera of a handheld device, but the invention is not limited thereto. In some embodiments a conventional digital camera can be applied to incorporate both the roles of the QR code scanner and the image scanner. The display 146 can be applied to selectively display the images such as the fused color QR code or the color image to a user, but the invention is not limited thereto.

As appreciated in the FIG. 10, the memory 130 may include program instructions 132 which can be executed by the processors 110 to complete any of the steps in the method for generating the color QR code disclosed hereinbefore. The program data 134 may include any data or information pertaining to the method for generating the color QR code disclosed herein.

It will be apparent to the person skilled in the art that the computer system 100 is only for illustrative purpose instead of limiting the scope of the invention. Particularly, the computer system and the devices may include any combination of hardware or software that can perform the indicated functions, including computers, network related applications, handheld devices, etc. The computer system 100 may connect to other devices not included in the drawing or may operate individually. Besides, the functions of the illustrated components may be incorporated into fewer components or be distributed among additional components. It is understood that in some embodiments, the functionality of some of the illustrated components may not be present and/or additional functionality may be added, all without departing from the spirit or the scope of the present invention.

A person skilled in the art should appreciate that while various items in the illustration are stored in memory while being used, part of these items or all of them may be transferred between memory and other storage devices for memory management and maintaining data integrity. Furthermore, in other embodiments some or the entire component of the software may be executed in memory on other devices communicating with the illustrated computer system via inter-computer communication. Some or all of the system components or data structures may also be stored as instructions or structured data on a computer-accessible medium or a portable medium readable by an appropriate drive.

In accordance with the embodiment(s) of the present invention, the components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method including a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The methods described herein may be implemented in software, hardware, or a combination thereof. In addition, parts of the steps of the method may be changed and various elements may be added, recorded combined, omitted, modified, etc. While the means of specific embodiments in present disclosure has been described by reference drawings, numerous modifications and variations could be made thereto by those skilled in the art without departing from the scope and spirit of the invention set forth in the claims. The modifications and variations should in a range limited by the specification of the present disclosure.

What is claimed is:

1. A computer-implemented method to generate a color QR code, comprising steps as follows:
   generating a grayscale image according to a color image;
   providing a QR code, and dividing the grayscale image into a number of grayscale image modules matching a module number of the QR code;
   generating a threshold mask image from the grayscale image modules, the threshold mask image having a plurality of threshold values respectively corresponding to the grayscale image modules;

cutting out each center block from a center part of each of the grayscale image modules and calculating a characteristics value for each of the center blocks;

comparing the characteristics value of each center block of the grayscale image to an adjusted threshold value, and identifying a color of a corresponding module of the QR code as a first color or a second color, in order to identify the center blocks that need pixel luminance adjustment;

dividing the center blocks that need pixel luminance adjustment into a plurality of layers of blocks, wherein, each layer of the blocks is assigned with a corresponding weighting;

adjusting pixel luminance the plurality of layers of blocks using a robustness value and the corresponding weighting to produce an adjusted grayscale image; and generating a fused color QR code containing both information of the QR code and the color image, wherein, the adjusted threshold value is the corresponding threshold value of the threshold mask image compensated by the robustness value; for the center blocks in the grayscale image modules and the corresponding modules of the QR code, while the characteristics value is larger than the adjusted threshold value and the color of the corresponding module of the QR code is the first color, or while the characteristics value is smaller than the adjusted threshold value and the color of the corresponding module of the QR code is the second color, the center block of the corresponding grayscale image module is identified as needing pixel luminance adjustment.

2. The computer-implemented method for generating the color QR code of claim 1, wherein, while the characteristics value of the center block is larger than the adjusted threshold value and the color of the corresponding module of the QR code is the second color, or while the characteristics value of the center block is smaller than the adjusted threshold value and the color of the corresponding module of the QR code is the first color, pixel luminance of the center block of the grayscale image is maintained.

3. The computer-implemented method for generating the color QR code of claim 2, wherein, the plurality of layers of blocks form a plurality of frames and a center frame, and the corresponding weighting assigned to the plurality of layers of blocks reduces from the center frame to an outermost frame.

4. The computer-implemented method for generating the color QR code of claim 1, wherein, for the plurality of layers of blocks and the corresponding module of the QR code, while the characteristics value of a layer of blocks is larger than the adjusted threshold value and the color of the corresponding module of the QR code is the second color, or while the characteristics value of the layer of blocks is smaller than the adjusted threshold value and the color of the corresponding module of the QR code is the first color, pixel luminance of the layer of blocks is maintained.

5. The computer-implemented method for generating the color QR code of claim 1, wherein, for the plurality of layers of blocks and the corresponding module of the QR code, while the characteristics value of a layer of blocks is larger than the adjusted threshold value and the corresponding module of the QR code is in the first color, or while the characteristics value of the layer of blocks is smaller than the adjusted threshold value and the corresponding module of the QR code is in the second color, pixel luminance of the layer of blocks is adjusted.

6. The computer-implemented method for generating the color QR code of claim 5, wherein, while the characteristics value of the layer of blocks is larger than the corresponding threshold value minus the robustness value and the corresponding module of the QR code is in the first color, pixel luminance of the layer of blocks is adjusted to the threshold value minus the robustness value times the corresponding weighting.

7. The computer-implemented method for generating the color QR code of claim 5, wherein, while the characteristics value of the layer of blocks is smaller than the corresponding threshold value plus the robustness value and the corresponding module of the QR code is in the second color, pixel luminance of the layer of blocks is adjusted to the threshold value plus the robustness value times the corresponding weighting.

8. The computer-implemented method for generating the color QR code of claim 1, wherein in the step of generating the fused color QR code, the fused color QR code is reproduced from the adjusted grayscale image.

9. The computer-implemented method for generating the color QR code of claim 1, wherein the grayscale image modules are transformed into the threshold mask image by local binarization.

10. The computer-implemented method for generating the color QR code of claim 1, wherein the color image and the QR code are scaled to matching size and aspect ratio.

* * * * *